United States Patent
Breslin et al.

(10) Patent No.: US 7,850,066 B2
(45) Date of Patent: Dec. 14, 2010

(54) SMARTCARD SYSTEM

(75) Inventors: Anthony Breslin, East Kilbride (GB); Michael Peters, Glasgow (GB); Barry Sim Hochfield, Giffnock (GB)

(73) Assignee: ECEBS Limited, Sheffield South Yorkshire (GB)

( * ) Notice: Subject to any disclaimer, the term of this patent is extended or adjusted under 35 U.S.C. 154(b) by 1108 days.

(21) Appl. No.: 10/497,908

(22) PCT Filed: Dec. 9, 2002

(86) PCT No.: PCT/GB02/05565
§ 371 (c)(1),
(2), (4) Date: Apr. 18, 2005

(87) PCT Pub. No.: WO03/049056
PCT Pub. Date: Jun. 12, 2003

(65) Prior Publication Data
US 2005/0211759 A1    Sep. 29, 2005

(30) Foreign Application Priority Data

Dec. 7, 2001  (GB) ............................ 0129360.4
Oct. 28, 2002  (GB) ............................ 0225036.3

(51) Int. Cl.
*G06F 17/00*    (2006.01)

(52) U.S. Cl. ................................. 235/375

(58) Field of Classification Search ............ 235/375
See application file for complete search history.

(56) References Cited

U.S. PATENT DOCUMENTS

| 6,845,498 | B1* | 1/2005 | Odinak et al. .......... 717/100 |
| 6,892,301 | B1* | 5/2005 | Hansmann et al. ...... 713/172 |
| 2002/0174071 | A1* | 11/2002 | Boudou et al. .......... 705/41 |

* cited by examiner

*Primary Examiner*—Seung H Lee
*Assistant Examiner*—Tae Kim
(74) *Attorney, Agent, or Firm*—Gardere Wynne Sewell LLP (57) ABSTRACT

A programmable device carries an on-device file. An interface device is provided to interface with the programmable device, the interface device having an off-device file. Web (Internet) standard language operating software is stored in the programmable device in a compressed format, that software containing at least some of the file system and commands for accessing the file system which enable the on-device file and off-device file to interface with each other. The interface device further includes an upgrade file. The system operates to compare the upgrade file to the on-device file and upgrade the on-device file to the newer upgrade file. The system is further provided with a web (Internet) standard language file containing a configurable Security Environment. The system is further provided with a file including a data model ('virtual card') corresponding to a programmable device and adapted for downloading to the programmable device.

14 Claims, 6 Drawing Sheets

SMARTCARD SYSTEM

The present invention relates to systems utilising programmable devices such as so-called 'smartcards', including systems which use such devices for financial transactions. In particular, the invention relates to a programmable device, an interface device and a machine readable medium carrying operating software for use in a system which comprises a programmable device carrying at least one on-device file and/or application and an interface device for interfacing with the or each programmable device, the interface device being provided with at least one off-device file and/or application; the operating software enabling, in use, the on-device and off-device files and/or applications to interface with one another.

Most of today's smartcard solutions are proprietary, built to solve a specific business problem. Although systems are based on some ISO standards, they have generally been built from scratch with the smartcards themselves, card applications and terminal applications all based on proprietary technology. This has the effect of tying the customer to the supplier.

Such systems are also expensive to develop, inflexible and difficult to change and difficult to deploy and manage.

These problems have slowed the advent of smartcard technology in the wider market.

However, this may need to change with the widespread adoption of chip-enabled credit and debit cards issued under the banner of 'EMV' (Europay, Mastercard and Visa Payment Application specification) by the major issuing banks. Other sectors, apart from banking, are also looking at the possibility of using smartcard technology, including mass transport, government and local council agencies, education authorities, health organisations and the armed forces. All of these sectors have requirements which might best be met by using smartcard applications, ranging from secure identity, cardholder authentication, loyalty bonus schemes, and storing of personal information such as health records. Such systems might utilise a wide array of smartcard applications to run and manage them.

A great many other systems exist today which could become smartcard enabled but integration of such systems is expensive and also tends to tie the customer to a particular card supplier because of the many proprietary solutions involved.

Two categories of smartcard solution exist today; proprietary single applications which are custom made and run on a single specific type of chip, and multi-application operating systems which utilise an operating system which hides the implementation of the underlying chip from the resident applications.

Where a proprietary single application system is available, porting the application to another type of chip can be a lengthy and expensive process but the cards used in the system are themselves inexpensive.

Multi application smartcard systems, on the other hand, are very configurable as new applications or new versions of applications can be loaded onto the smartcard during live operation. Customers are not tied to a particular card supplier; they can choose any chip which will support that version of the operating system. However, multi application operating systems must be highly secure so as to prevent rogue code or data being loaded on the card or unauthorised deletion of applications on the cards. Implementation of these security functions and associated key management tends to make the cards used in multi application systems expensive and difficult to manage, requiring complex infrastructure to provide the capability for loading and deleting applications from the cards.

During the lifetime of a multi-application system it is, furthermore, likely that changes will have to be made to the system, both on and off the card and this, again, can be an expensive and time-consuming exercise.

In accordance with the invention there is provided a programmable device, an interface device or a machine is readable medium carrying operating software characterised by at least one file formatted in a web (Internet) standard language for self-describing messages, said file containing at least some of the file system and commands for accessing the file system which allow the on-device and off-device files and/or applications to interface.

Preferably, the web standard language for self describing messages is extensible Markup language ('XML').

In a further preferred embodiment, the or each file formatted in a web (Internet) standard language for self-describing messages is stored on the device in compressed format. This allows terminals or interface devices to 'discover' the format of the file system in the card, allowing easier management.

In one embodiment, the system of the invention is a component-based architecture framework which interacts with ISO 7816 compliant smartcard applications. This architecture allows both new applications and existing applications to interact with information stored on a smartcard without any knowledge of how or where that information is sourced. The system runtime uses a set of security policies and conditions to determine the access rights to the files and objects stored on the cards and modifies the behaviour of the system accordingly. For example, if a read command on a file requires the user to be PIN authenticated, a product ensures that the user enters a PIN and that the PIN is then verified before the product reads the data. The smartcard implements the same security policies and conditions as the application and therefore has the ultimate responsibility for ensuring appropriate authorised access to objects on the card.

The file system, structure and content, the commands for accessing the file system and the security conditions associated with the files in the file system can all be described uniquely by means of a file formatted in extensible Markup Language ('XML'), a web standard for self-describing messages.

This system has the advantage that smartcard resident applications and the corresponding card accepting terminals can be delivered to market quickly and inexpensively by:

configuring the file system and security environment conditions using off the shelf XML Configurator tool;

creating the file system and security on the card (assuming the appropriate application has already been loaded);

building future card applications from a pre-configured set of functions using the XML file as the build information document.

A specific and generic client user interface application can be developed quickly from the XML document using XML style sheets and other standard technologies. Also reconfigurable components and existing applications can use the system's XML interface to access the smartcard information and, if authorised, to modify the data and write it back to the card.

An embodiment of a system in accordance with the invention will now be described in detail, by way of example, with reference to the drawings, in which.

As outlined above, the system of the invention has as its aim to provide off-card applications with access to on-card applications using generic components. These generic components are, in accordance with the invention, highly configurable through the use of XML files, or other web standard markup language, to store configuration data. These files describe:

the content and structure of 'APDU' (Application Protocol Data Unit) commands which can be sent to the card application;

the structure and content of data which can be read and updated on a secure file system on the card;

the security conditions and actions associated with the commands on objects on the cards.

When the system starts up, the system's smartcard terminal readers are configured. Off-card applications register with the controller components to indicate that they are interested in certain card applications. When a card is inserted into the card reader, the controller components interrogate the card to determine the applications running on it. The controller then notifies all off-card application(s) interested in the on-card application(s) found. Those off-card application components can then interact with the on-card applications until the card is removed.

Controller components—marshal access to applications on the card by the off-card applications to prevent synchronisation problems while the card applications and off-card applications are interacting.

Figure 1:
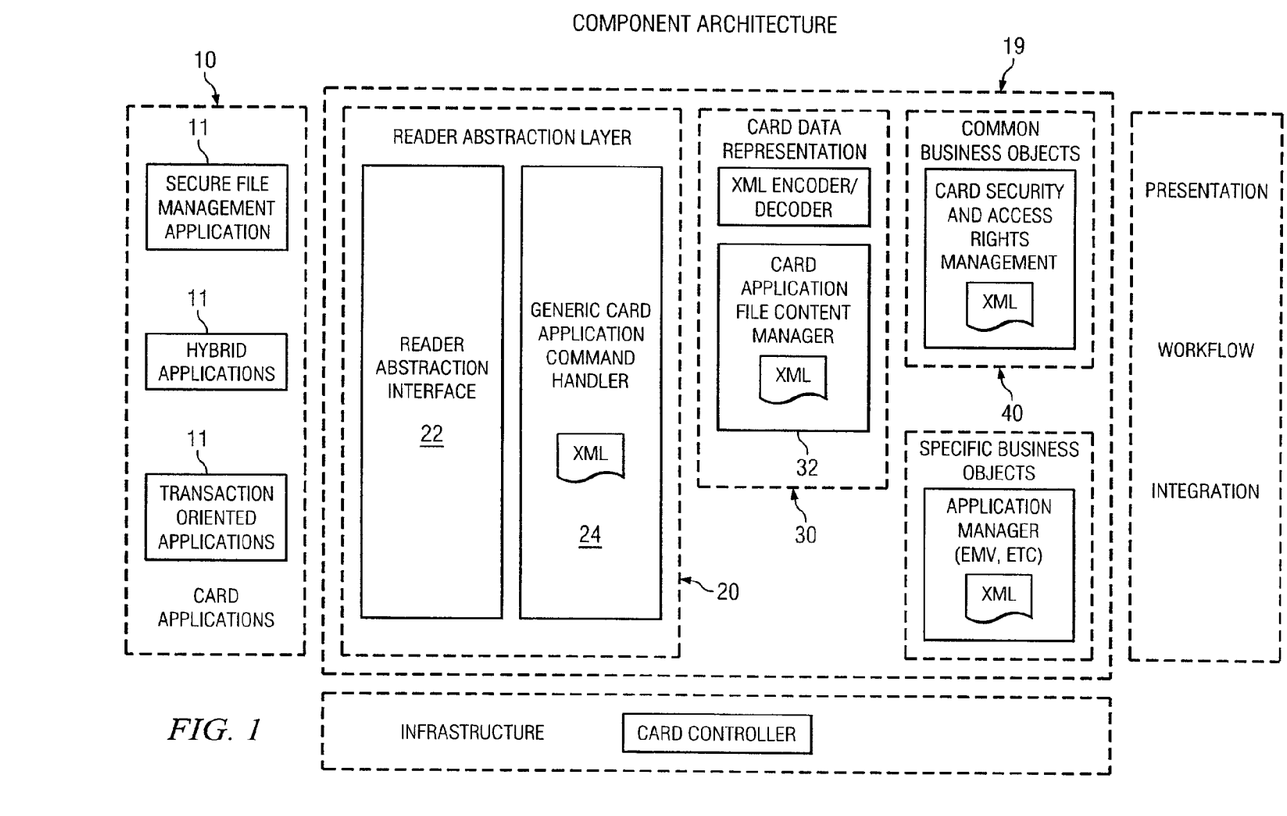
FIG. 1 is an overview of the component architecture of the system of the invention.

FIG. 1 illustrates the component architecture of the system of the invention. The system comprises a smartcard 10 carrying a variety of on-card applications 11. The system further provides card-reading infrastructure 19 including a reader abstraction layer 20, card data representation 30 and common business objects 40.

As shown in FIG. 1, the off-card applications include a reader abstraction layer 20 comprising a reader abstraction interface 22 and a generic card application handler 24.

The reader abstraction interface 22 interfaces with on-card applications through the card readers (not shown) present in the smartcard terminal of the system. It encapsulates the card readers and card reader drivers used in the system, concealing these from the calling components. In a preferred embodiment, the reader abstraction interface is a proprietary wrapper around the Open Card Framework ('OCF') which is an open source, Java-based, smartcard framework providing access to smartcard applications using any PC/SC compliant or OCF compliant reader drivers. It can also be designed in such a way that reliance on OCF can be avoided by replacing the OCF with an alternative, for example, a framework which can interface with a proprietary reader Application Programming Interface ('API') on a small device platform.

The second component of the reader abstraction layer 20, the generic card application command handler 24 works on a per card application basis and is primarily responsible for formulating APDU commands and sending them to the card applications via the reader abstraction interface 22. A suitable generic card application command handler is defined, for example, by ISO specification 7816 Part 4.

The generic card application command handler 24 provides a method such as doCommand to client components wishing to communicate with the on-card applications. The client component indicates the type of command to be executed, the object on which the command is to be executed and any other relevant information such as the identity of the file on which the command is to run. For example, the client component may indicate that the command selectFile is to be run on an Elementary File named file1.

The command handler 24 then constructs the appropriate APDU command to send to the card 10, using the information from the client component and a pre-configured XML file which contains the structure and format of all the valid commands supported by the on-card application. If a command is not to be found in the XML file then it is not a valid command supported on the card. Typically, the data block in the APDU can only contain up to 256 bytes of data. For data blocks larger than this, the command handler 24 has to construct and send a number of APDU commands, each containing up to 256 bytes, until all the data has been sent to the card 10.

The generic card application command handler 24 receives back an APDU response from the reader abstraction interface 22 indicating the success, or otherwise, of the operation. The APDU response may contain a data block or blocks containing data from the card. These are returned to the calling component.

The card data representation layer 30 includes a card application file content manager 32 which encapsulates the content of a card application file system and which provides access to that data through a well-defined interface. The content of the file system is represented and stored in an XML document.

Client components make requests for data from the content manager 32 and are returned an XML node containing the requested data. Updates to the data are also made through the content manager 32; the client component passes an XML node containing the updated data, which is converted into commands to be sent to the on-card application by the generic card application command handler 24. The content manager 32 makes use of an XML encoder/decoder 36 to parse data received from the on-card applications in internal format to XML and vice versa. The XML encoder/decoder takes data received from the card and stores it in the appropriate XML node or, alternatively, takes an XML node and constructs the appropriate objects in the form required by a card application. For example, the card applications may store data in TLV-BER (tag, length, value—basic encoding rules) format but the content manager 32 encodes such data into an XML node for further processing.

The content manager 32 also determines the access rights of the commands on files in the file system in collaboration with a card security and access rights manager. In this way, clients receiving data are notified as to whether the data is read only, update only, or whether they have read and write access.

The Terminal has associated with it one XML document per card format. This document is identified by a file name and contains all the file-associated data for that card's on-card application. It identifies all Dedicated and Elementary Files, the data contained within these files, associated data ranges (that is, minimum and maximum values) and security conditions for commands on those files. It may also include business rules embedded in the data within the files so as to allow a task engine to interpret and take appropriate action.

This XML document can be stored in compressed format on the file system and the card. The XML document is also used in the on-card process to populate a card with the necessary card application functions.

The common business objects layer 40 of the card reader infrastructure comprises a card security and access rights manager ('SARM') 42 which uses security policies and conditions expressed in the XML files to determine the access rights of off-card applications to objects stored on the card 10.

The SARM provides the means to:

determine whether a particular operation on an object is allowed;

determine the security condition for an object and undertake the required authentication based on the policies and condition associated with the object, for example, the SARM may, if appropriate authenticate using Global PIN;

digitally sign, check signatures, encrypt and decrypt;

check the validity of a card inserted into the system, that is, whether it is blocked, expired, etc.; and/or check the validity of a card application, that is, whether it is blocked, expired, etc.

The SARM design is based around the implementation of ISO 7816, part 4, Security Environments ('SEs'). The SE controls the actual implementation of the security policies and conditions for an object and can be shared across different card applications. It can also be application specific, controlling the secure functionality for a particular business environment.

The state of the card and the card applications directly affect the use of the card and the access types allowed on an object in the file system. For example, a card may be blocked so that only unblock commands are allowed or a card may be PIN verified to permit read/write access to some files in the file system, read only access to others and no access at all to the remainder.

Figure 2:
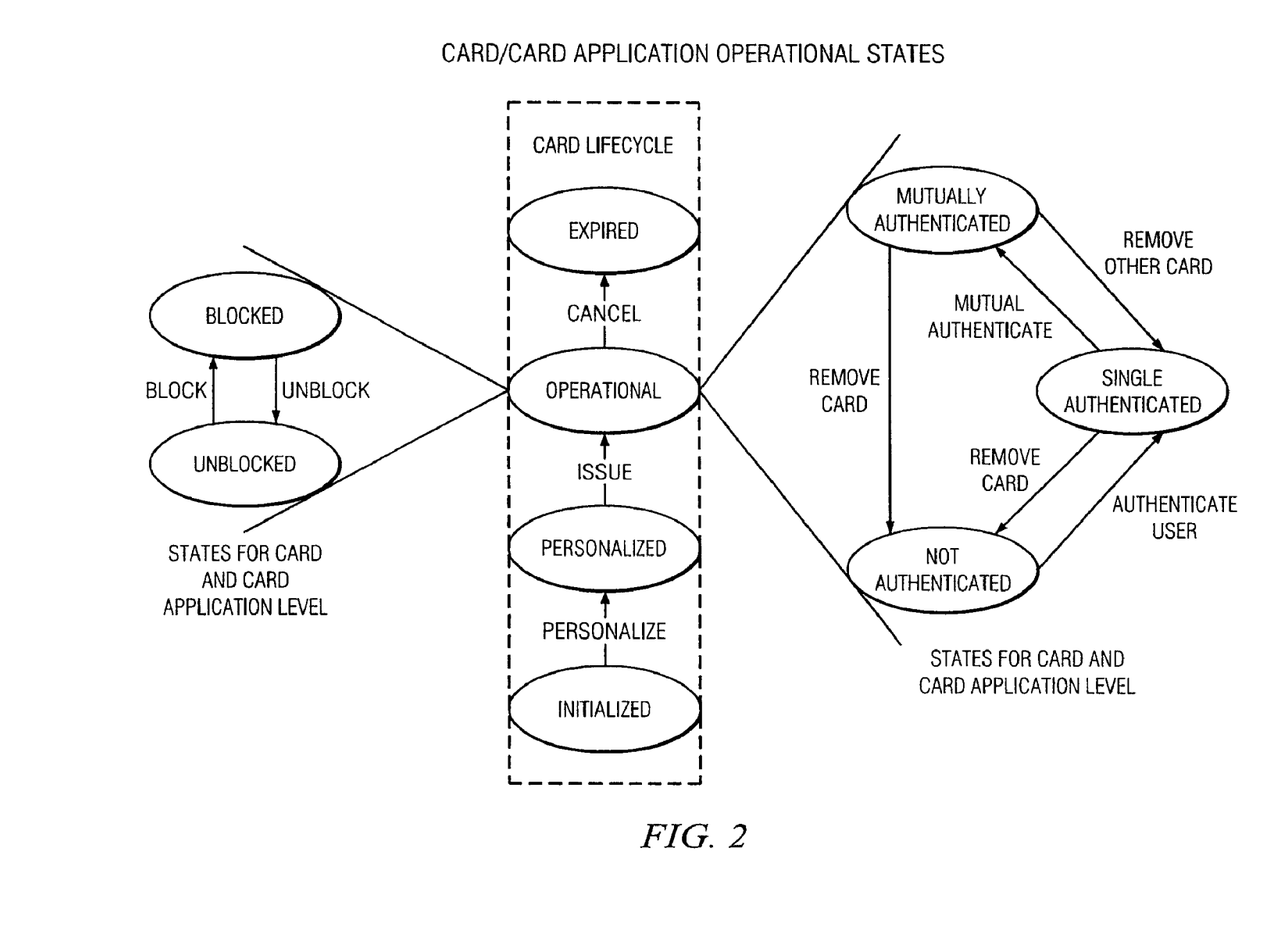
FIG. 2 is a schematic diagram illustrating the card and card application operational states.

Allowable states and the actions resulting in a change of state are defined in the state diagram which forms FIG. 2. The authentication states shown in the figure are only relevant when the card is in an operational state. In other phases of the card's life cycle, other security states may exist.

Access rights to a card object are defined on the card and in the card XML document. In the embodiment described, two example schemes which may be supportedare:

ISO 7816-4(2002), security environment based; or mask-based access rights allowing categories of users to have different access rights to an object. An Access Rights State object is created which provides the current state and the current access rights.

Figure 3:
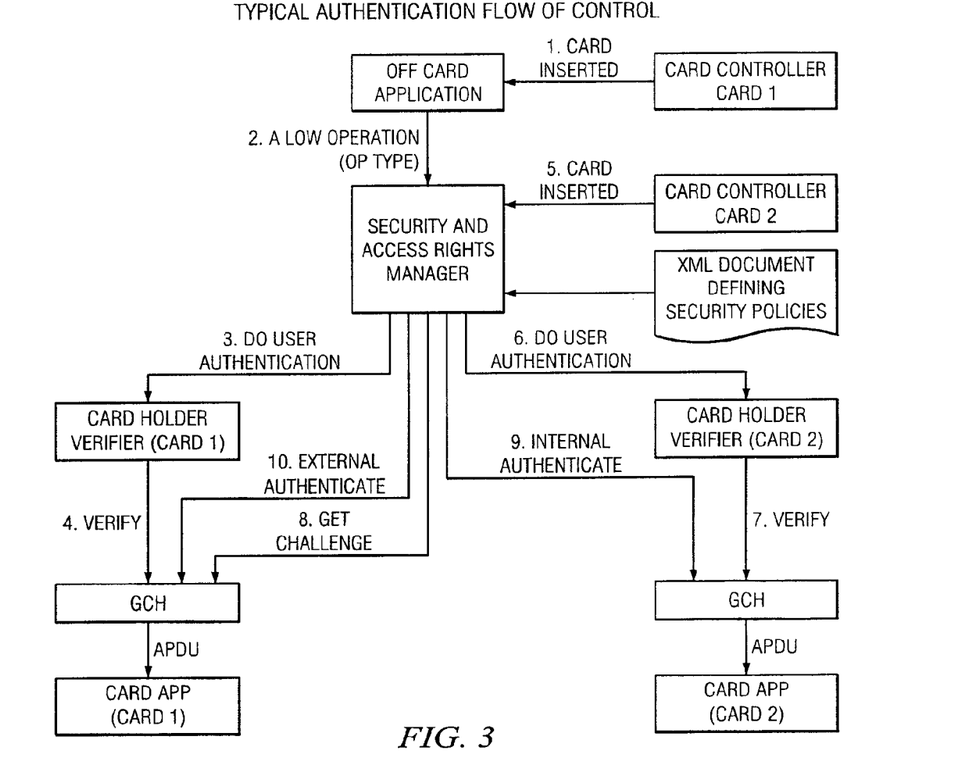
FIG. 3 illustrates the typical flow of control for authentication of one entity by another.

FIG. 3 shows a typical authentication flow of control for a two card transaction where both cards have to be user authenticated before the transaction can take place.

For the authentication scheme of FIG. 3, a card application object would have an Access Mode (AM) byte indicating that the operation required is allowed.

In an AM byte, each bit 7-1 indicates either the absence of a security condition byte when set to zero or the presence of such a byte when set to one, in the same order, 7-1. When bit 8 is set to one, some of the other bits, 7-4, may be used for other commands, for example, application specific commands. Draft ISO Specification 7816 part 4, published in April 2002, defines AM bytes for dedicated files (DFs), elementary files (EFs), data objects and tables and views.

Associated with the Access Mode byte is a Security Condition (SC) byte indicating that the object requires user verification and external authentication.

The SC byte defines what security conditions have to be satisfied and a reference to a Security Environment (SE) which details how the conditions are to be satisfied. The Access Mode and Security Condition bytes are encoded in the same XML document that describes file based objects on the card.

Security Environments (SEs) are defined in ISO 7816-4 (2002) and are used to group a set of fully specified security mechanisms. A SE can be used to reference the cryptographic algorithms to be executed, the mode of operation, the keys to be used and any additional data required, such as initial block values. The SEs must support the security functions required by and defined within the SC bytes. The list of functions an SE might be required to support is:

Check External Authenticate (verify the correct keys have been externally authenticated with)

Check PIN (verify that the correct PIN or user authentication (biometric) data has been submitted)

Decrypt (decrypt the command or command data)

Encrypt (encrypt the response data)

Verify Signature (verify the received MAC)

Generate Signature (create a MAC over the response data)

The SE does not have to support all of these functions, only those that are used by the application the SE is a part of. Each application may either provide its own SEs or may use global SEs provided by the card platform.

The SE may be configurable as will be described in greater detail below.

The off card application requests handling of an operation on a particular object. The SARM uses the AM and SC to instantiate the SE. The SE may decide that a Global PIN verification is required and invokes doUserAuthentication method on the CardHolderVerifier. This class performs user authentication. The SE then decides that external authentication is required and may wait for the second card to be inserted or perform the authenticationdirectly with another host using another method. It may request this in a dialogue with the user.

If required, a second card is inserted with the appropriate application. The object on the second card will have AM and SC bytes associated. These may require that cardholder verification takes place, in which case, another SE controls this process.

Figure 4:
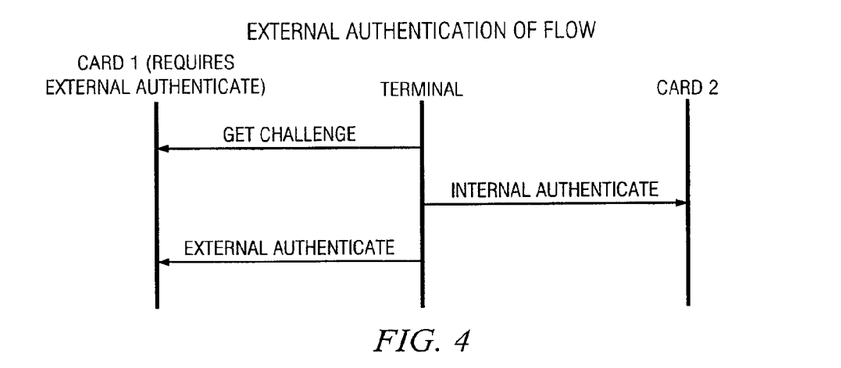
FIG. 4 shows the external authentication flow of the above.

Once the second card has been authenticated, external authentication can proceed. The SE issues a Generate Challenge from the first card which is signed by the second card using Internal Authenticate command. The result of this is sent to the first card in an External Authenticate command as shown in FIG. 4.

In a mutual authentication scheme, each card would authenticate the other. Mutual authentication can be symmetric, using a shared key scheme, or asymmetric using a certificate scheme. This is configurable within the system, for example, by means of the Configurator product.

The SARM also uses the AM and SC bytes to determine the confidentiality and integrity of the data sent and received from the Smartcard. Secure messaging bits can be set in the SC bytes to indicate if encryption and/or Message Authentication Certificates ('MACs') are required for the data. The associated SE will indicate the keys to be used.

The Configurator can be used to configure the security policies and conditions for the card application and for the off card application. Alternatively, off-the-shelf XML tools can be used to edit the XML document. However, error is more easily introduced using the latter method.

Components within the specific Business Objects layer contain application specific classes. They run the business specific logic of the application, making use of the services of the SARM and the Card Application File Content Manager to retrieve and update data on the card. They also use the security services provided by the card. They do this either by interfacing with these components directly, or, more usually, by making use of Common Business Objects to access these other services.

Applications in this layer are responsible for ensuring that they are interacting with the appropriate version of the card application.

The Card Controller controls access to the card to ensure no synchronisation problems occur when more than one off-card application wishes to interact with an application on the card.

Clients wishing to access a card application must first request the appropriate resources from this component. This component allocates resources as follows:

if no other client is currently using the resources then resources are allocated to the requesting client (this is in the form of passing back references to appropriate objects);

otherwise, the request is rejected and the client has to try again later (in the future the client will be able to wait for resources to be allocated or will request a callback);

when a client has completed its transaction, it releases the resources so that other clients can gain access to them.

The Card Controller interfaces with the Reader Abstraction Interface to determine when a card is inserted or removed and takes appropriate action as follows:

for card insertion, the component determines the applications on the card and notifies registered off-card applications;

for card removal, the component notifies all registered clients. It is up to the client to take the next action (the card may have been removed in the middle of a transaction)

Using XML to configure the off-card and on-card file system and command structures has many advantages. Firstly, the off-card system is kept fully in step with the on-card, making integration of the two quicker and easier.

XML, as an industry Internet standard, sponsored by the W3C organisation, has spawned many off-the-shelf tools and parsers. These can easily be used to create and configure XML files. XML is becoming the de facto Internet standard for system-to-system integration. By using XML, the system of the invention can easily be integrated into systems using the XML as the interface. This allows existing systems to quickly and inexpensively become Smartcard enabled.

The system is very configurable, allowing files, system attributes and security policies to be changed by simply changing the XML files. No redesign or coding need be undertaken.

The system allows business and security analysts to configure the business data and rules governing security into the system. These rules are used at build time to configure the on-card application and for both on-card and off-card application behaviours at runtime.

A key element of the solution provided by the system of the invention is in the area of application management. Providing a highly configurable smartcard application environment closely associated with the off-card environment permits the possibility of upgrading file systems in the field, that is, when a cardholder presents his card to a terminal capable of interacting with the card application.

The requirements for such application management are that a user can:

easily configure file systems and contents, both to create new file systems and modify existing ones;

easily configure security conditions on files, both to create new ones and modify existing ones;

create file systems on the card either directly or using script processing (see below);

allow file system configuration to be modified, thereby modifying the file system on cards, out in the field;

One prerequisite to such a system is that different versions of file systems can be recognised and identified. The Configurator referred to above can be used to configure a file system on a smart card, resulting in an XML seed document being populated. The card issuer/scheme owner is allowed to baseline the XML file, providing it with a given version number. The Configurator can be used to modify the XML file to add, delete or modify files. This results in a new version of the XML file being produced.

The application management process encompasses two processes 'Terminal Driven Upgrades' ('Process 1') and 'Script Processing' ('Process 2'). These are illustrated in FIG. 5.

Figure 5:
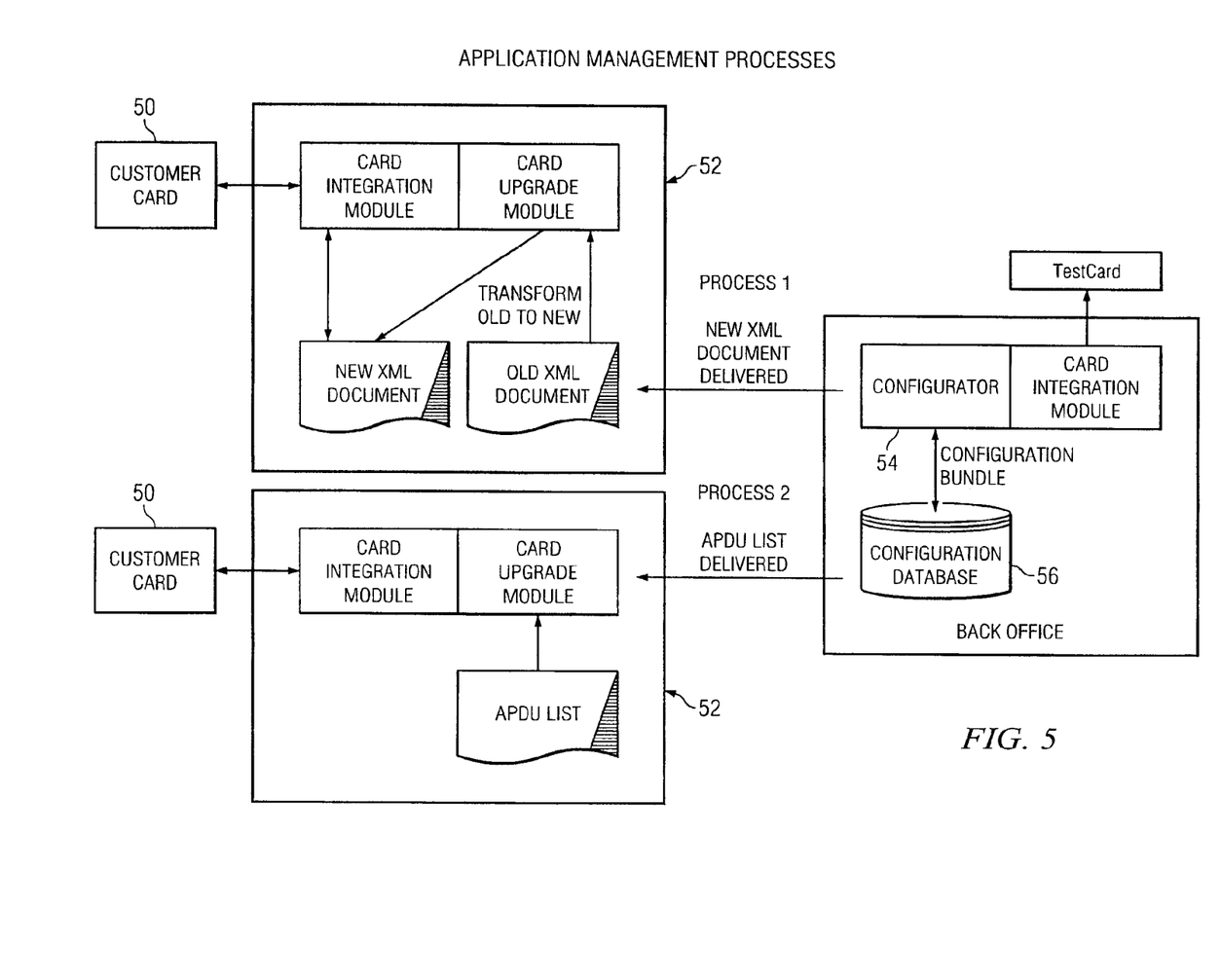
FIG. 5 illustrates application management processes in the system of the invention.

In the Terminal Driven Upgrade process—designated in FIG. 5 as 'Process 1', the customer owns a card 50 populated with a file system and a terminal 52 with which the card 50 is intended to interact contains an associated XML file describing the structure of that file system. When the card issuer/scheme owner wishes to change the file structure on the card at the back office, he or she uses the Configurator tool 54 to make the desired changes. A new version of the XML file is produced containing the changes made to the file system. This new XML file is stored in the card issuer/scheme owner's database 56 in a configuration bundle, which contains both the new version and all previous versions of the XML file.

The card issuer/scheme owner then distributes the XML file from the back office to all terminals 52 using a software distribution system. At the terminal 52, the new version of the XML file is stored alongside the old version.

When a card is inserted, a version number is read from the card indicating the version of the file system held on the card 50. If the card holds the old version, the old version of the XML file at the terminal 52 is populated using the data held on the card 50. A Card Upgrade Module is then run to transform the old version of the file to the new one and data from card files in the old XML file is transferred to the new XML document. The new XML document is then written back to the card and the version of the file system upgraded to the new one.

Once the card file system has been upgraded to the new version, the terminal 52 will interact with the card using the new XML document.

Instead of the Terminal Driven Upgrade described, the application management may be implemented by means of script processing ('Process 2' in FIG. 5).

Again, the card issuer/scheme owner uses the Configurator tool at its back office to make the required changes and stores the new XML file in a configuration bundle at the back office database.

The Configurator tool is then used to generate an APDU list that covers changes from the previous XML version to the new one. The card issuer/scheme owner does this by loading the original file system on to a test card and capturing the APDU list in a file. The card issuer/scheme owner then updates the file system on the test card by applying the second XML file to the test card, capturing the APDUs sent in a file. The Configurator determines the differences between the two APDU lists and produces a third APDU list containing the new APDUs. The list is encrypted using keys and algorithms defined in the security architecture for the scheme.

The script and the new XML file are delivered to each terminal 52 when the terminal goes on-line or during a software distribution process.

At the terminal, when the customer's card 50 is inserted, the version of the file system on the card is compared to the version that generated the APDU list. If the card version is older, the Card Upgrade Module will run the script processing to upgrade the card 50. Once the upgrade has been completed, the terminal 52 will use the new XML file to interact with the file system on the card 52 with a corresponding version number.

Thus, in summary, it will be appreciated that, at the terminal 52, the Card Integration Module generates the APDU list to a file when configured and checks the version of the file system on the card 50 against that on the terminal 52 and determines that an upgrade should be undertaken if the version on the card is older than that at the terminal.

The terminal's Card Upgrade Module transforms one populated XML file to a new version, populates the card from the new version of the XML file and runs script processing if an APDU list is supplied.

The Configurator tool used at the card issuer/scheme owner's back office allows the file system to be modified, allows an APDU list to be generated using a test card either for populating from scratch or for differences, and handles differences between APDU lists to produce one APDU list for special cases such as testing of a new scheme.

The system also permits the Security Environments referred to above to use file referencing. Instead of keys and PINs (Personal Identification Numbers) being hard coded in memory associated with the SE, keys and other security objects such as PINs can be stored in files in the file system. These files can be referenced from within an SE on the card that handles the control of security operations requested by the terminal. Similarly, any security control parameter such as the algorithm type used can be stored within a file and referenced from the SE. The security bytes in the header of an object (ADF, DF and EF) on which the operation is to be conducted indicate the references to the security objects required, such as PINs and keys.

Figure 6:
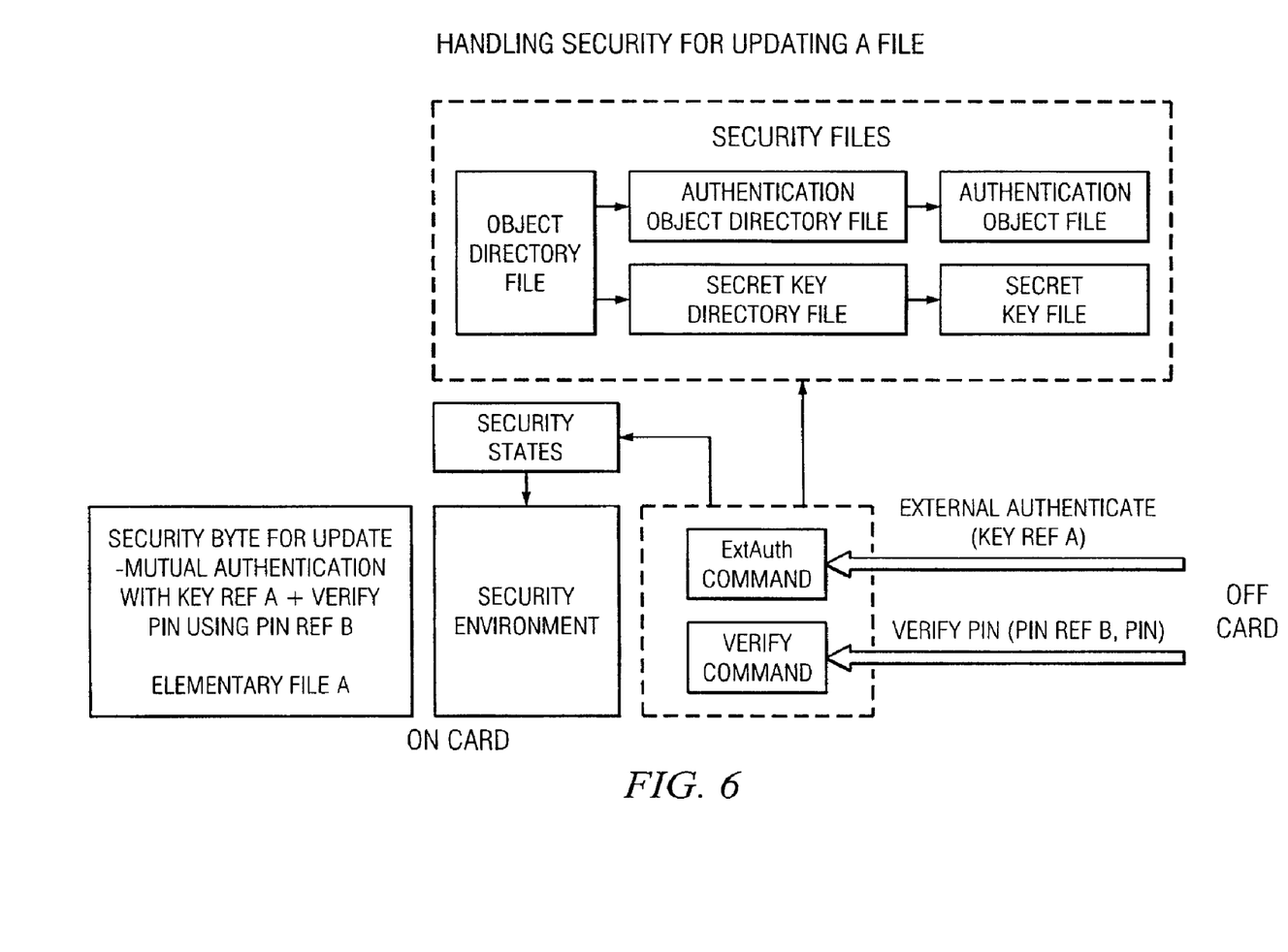
FIG. 6 is a schematic diagram illustrating security files used in handling security for updating a file within the system of the invention.

FIG. 6 illustrates, by way of example, the files required for the SE to handle the security for updating Elementary File A whose security attributes have been set to External Authentication using Key Ref A and PIN using PIN reference B for update.

When the off-card application wishes to update Elementary File A, it must first issue a Get Challenge then an External Authenticate. The External Authenticate command references Key A in P2 of the APDU command. The off-card application then undertakes cardholder verification using PIN by issuing a Verify PIN with PIN Ref B (in P2 of the APDU command) and the candidate PIN. The on-card SE uses the references for the Key and PIN to access the appropriate security files containing the actual values. These files also have associated security bytes, dictating the conditions under which access is allowed.

An administrator with sufficient security can configure the security for each operation on an object on the card. This will set the security bytes in the security header in the object when it is created on the card. The administrator is able to select the security object references such as PIN and Key for operations on the file and to configure the security for the security files which contain the security objects.

As mentioned above, the SEs used by the invention may themselves be configurable. For example a configurable SE may allow tailoring of the following security attributes:

Define which keys are used for accessing a particular file (Key ID).

Define the key value and other attributes associated with a particular key.

Define which algorithm is used for authentication, secure messaging etc.

Tailor the authentication algorithm. (Retail Message Authentication Code (MAC) vs. full Cipher Block Chaining (CBC) MAC for example).

Define what Card Holder Verification (CHV) data is used for cardholder verification (file ID & value of data).

Be able to dictate whether a file should use the "global" values for authentication or local values.

By default, the security mechanism should not come into effect immediately on creation, but only after another file (EF or DF) is selected, i.e. after the created file is no longer the currently selected file.

The basic system described above can be enhanced in two areas, as follows.

The first enhancement relates to the system's use as an ultra-rapid application creation and management regime with any type of card from entry level and low security cards such as secure memory cards to any Smartcard with basic storage functionality. In other words, the on-card runtime application environment can become optional.

The enhancement consists of an extra stage, optionally introduced into the Configurator tool referred to above whereby a 'virtual card' data model is constructed, one for each real card type. This is similar in concept to a high-level language compiler having multiple target micro-controllers.

The enhanced Configurator tool allows the user to create and modify the application on any card, producing appropriate XML Document versions. The terminal resident aspects of the invention ('middleware') described herein, use the XML document version to map the data on the card (however held) onto the structure described in the XML document. The terminal middleware uses the XML document to determine the security associated with operations on the data and ensures these requirements are met before an operation can be executed, eg. a PIN is required before a 'Read' operation can be executed.

The middleware also uses an application specific Security Environment to handle the security of the card, utilising any on card features, if present.

The middleware also contains a card specific Generic Command Handler, which produces the appropriate APDU commands to communicate with the card.

What happens on the card when the basic, non-enhanced version of the software described above is used, is that the set-up or configuration of the run-time code means the card based code interprets commands arriving from the terminal to perform the application in real time, but inside the card, the card software, in effect, maps the data associated with each command into the card's own memory.

The enhancement adds another 'translation' process with its input as the middleware's output, to construct an actual memory image to be loaded onto some other card. This image represents a virtual card but can be loaded into any card that has basic storage. The image is built by reformatting the TLV data into an efficient (for example) linear binary file. Compression with inherent encryption can be employed. This process can apply to, and therefore be mapped onto, non-secure removable storage devices that are not in the form of Smartcards at all, such as 'flash memory sticks'. When the data is then read back from the storage device it is reformatted to populate the XML described structure.

If the data image is stored in the clear, that is, unencrypted, then it could be interpreted/reverse engineered to hack the service. However, if the middleware's additional translation process has knowledge of the real card's own security capabilities, then they can be activated either transparently to the 'virtual card' (i.e. used by the terminal as a bulk security feature inside which the application's visible security conditions are emulated) or non-transparently, as a 'one to one' mapping of the virtual card security function to the real security card function. This will vary case by case, with differing card feature sets, which is why there will be a set of 'target' real card platforms to choose from for the middleware's 'virtual card compiler'.

A number of options are available for security. For example, if the card is of the simplest memory type with no security features at all, all the memory image can be encrypted/decrypted or MAC'd by the terminal on the fly before storing/retrieving to and from the card, and keys for this can be derived from an application specific 'master key' and the unique serial number of the card.

For the lowest level of security the master key can be stored in the terminal runtime application, but for more security it can be stored inside a Secure Access Module (SAM) resident inside the terminal where it computes the card specific key on the fly. In this way even if the card specific key, which is running in the terminal's memory is seen, only that one card is hacked, not the scheme. It should be borne in mind that there are several strategies which can be employed now to gradually increase the security but only based on the constraints of the particular card to be used up to the 'best case' in terms of security and performance, which is the original model where the card runs a full corresponding configurable application.

The key advantage of this approach is that now the same applications can be built and managed ultra-rapidly with the Configurator tool but then compiled down to any card type providing the card has at least simple data storage functions. The ability to do this is only limited in capacity, performance and security by the limitations of the actual target cards themselves.

A further enhancement of the basic system outlined above relates to the modification and/or enhancement of existing, and introduction of new, applications onto cards and terminals which are already operating in the field, without the need for a recall of any cards or terminals and without disturbing any incumbent data on these cards.

Current Smartcard Multi-Application Operating Systems (MAOS) (as represented by JavaCard and MULTOS) use Virtual Machine models as originally invented for multi-user mainframe computers in the sixties. The particular advantage for a Smartcard with these MAOS's is that they can claim to have 'firewalls' that isolate applications. However, as a result, these applications have to be programmes each with their own code and data, and so sharing the data requires each and every application to be written with knowledge of the other and a communications protocol built inside each. This is highly inefficient if common data is needed by several applications but there is no standard approach for this.

MAOS's do allow application management and authority to follow 'role and key holders' in terms of which policies are enforced by the card operating system and by each application. However, if an application needs to be modified, it is treated by the MAOS as an 'atomic' entity with no separation of code and data, that is, all of it is deleted and replaced with a new version. Consequently, all the card data is lost. This puts a burden on the card/application management system in that it must somehow cater for preserving the data as needed and so each card/application management system becomes very 'application-data specific'.

As the present invention already involves the use of an 'on-card' application environment which is configured using specific secure file system management commands, it is possible to build specific versions representing both the on and off card models, then compute the exact differences in these versions, and upgrade the terminals and the cards in the field without the need to delete any data or card behaviour already configured.

After the differences are computed, a script of new ADPUs is created which introduces the new application behaviour, and any security elements that may be needed. As these security elements may include keys and other sensitive data they cannot be transmitted in the clear to the card base. While a secure messaging channel could be set up to a central server whenever a card requiring upgrade is introduced to a terminal in the scheme, this has the disadvantage of requiring the terminal to be constantly 'on-line' to the central server. A more elegant and cost efficient way of performing the card and terminal upgrade is as follows.

The differences files are created as described, one for the card, one for the terminal. The XML version upgrades the terminal application environment with the new data model and behaviours expected from the upgraded card. (As all the security elements are card based, this file does not need to be protected except, perhaps, to prevent 'denial of service' attacks if the terminal portion is corrupted, so standard integrity checks can be used.)

However the file for the card consists of a secured script of ADPUs, which is loaded into the card. This secured script is called a 'frame', and is protected both by encryption and by MACs. When the Frame is loaded the card checks its integrity via the MAC, and if OK, it decrypts the payload to reveal the script of APDUs. The card has a 'Script Engine' which emulates a secure terminal and so runs the commands upon itself. In this way, specific commands can precisely modify the existing application file structures as well as introduce new data and security rules.

The frames can be built initially using an industry standard Hardware Security Module (HSM), in which all the key material is securely stored. The software used to construct the frames refers to a database containing the profile of each card, such as its applications and the IDs of each key loaded or requiring to be loaded, which can be card unique. The HSM then populates the frames by inserting the real key material in the place-holders set out by a Frame Constructor layer then encrypting and signing it, ready for distribution to the terminals, which then upgrade the cards based on the version number of the card application environment's configuration.

Figure 7:
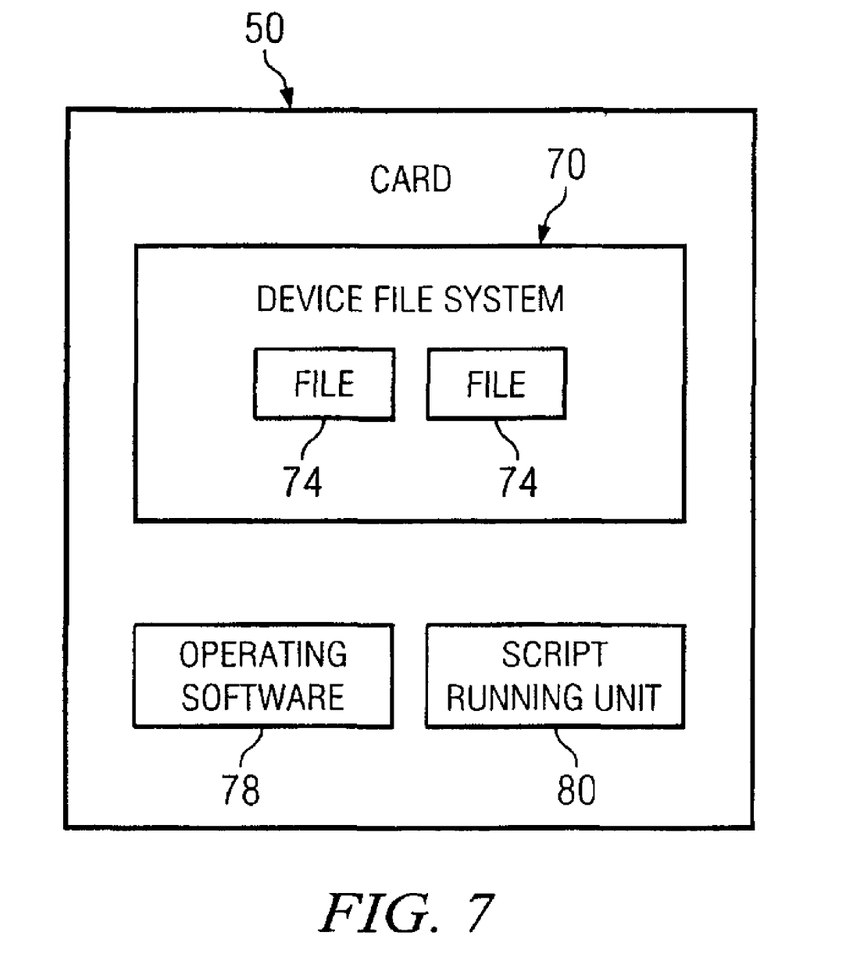
FIG. 7 is a schematic diagram illustrating a programmable device according to an embodiment of the invention.

FIG. 7 illustrates a programmable device, i.e., the card 50, according to an embodiment of the invention. The card 50 includes on-device file system 70, which includes at least one file 74. The card 50 also includes operating software 78, and a script running unit 80. Each file 74 has a file structure and content and may have a security condition associated therewith. The operating software 78 enables the on-device file system 70 to interface with at least one off-device file and/or application (See FIG. 5, for example) and comprises commands for accessing the on-device file system. The structure and content of each file 74 of the file system 70, security conditions associated therewith and the commands to be used for accessing the file system 70 are defined by files formatted in a web (internet) standard language for self-describing messages. The card 50 further comprises a script running unit 80 for running a script derived from a file formatted in the web (internet) standard language for self describing messages to modify any or all of the structure and content of the file system 70, any security conditions associated therewith or the commands for accessing the file system 70.

The invention claimed is:

1. A programmable device having:
   an on-device file system comprising at least one file having a file structure and a security condition associated therewith;
   operating software for enabling the on-device file system to interface with at least one off-device file and/or application and comprising commands for accessing the on-device file system;
   wherein the structure of each said file of the file system, security conditions associated therewith and the commands to be used for accessing the file system are defined by files formatted in a web (internet) standard language for self-describing messages; and
   wherein the programmable device further comprises means for running a script derived from a file formatted in a web (internet) standard language for self describing messages to modify any or all of the structure of the file system, any security conditions associated therewith or the commands for accessing the file system.

2. A programmable device according to claim 1 in which the web (internet) standard language for self-describing messages is extensible Markup Language ('XML') and the at least one file is an XML document.

3. A programmable device according to claim 1 or 2 in which at least one file is stored in compressed format.

4. A device according to claim 1 wherein the means for running a script comprises a script engine capable of running one or more Application Protocol Data Units ('APDUs') loaded from an interface device to modify the file system, and structure, or the commands to be used for accessing the file system or any security conditions associated therewith.

5. A device according to claim 4 comprising means for decrypting APDUs loaded from the interface device in encrypted form before they are run by the script engine.

6. A device according to claim 4 comprising means for verifying a digital signature before the script engine runs a script loaded from the interface device.

7. A device according to claim 4 comprising means for verifying a Retail Message Authentication Code ('MAC') before the script engine runs a script loaded from the interface device.

8. A card reading interface device for interfacing at a card reader thereof with a programmable device according to claim 1, the interface device comprising means for upgrading the on-device file system by loading to the programmable device a script derived from at least one file formatted in a web (internet) standard language for self-describing messages so as to modify any or all of the definitions of the structure of the on-device file system, the commands to be used for accessing the file system or any security conditions associated therewith.

9. An interface device according to claim 8 comprising means for determining which version of the on-device file system is carried by a programmable device at a card-reader thereof, and for generating a script of APDUs in dependence on a comparison of that version with versions held at the interface device, and means for loading the script to the programmable device to upgrade the on-device file system.

10. An interface device according to claim 8 comprising means for receiving a script of APDUs from a software distribution system and means for loading the script to the programmable device to upgrade the on-device file.

11. An interface device according to claim 10 comprising means for decrypting a script of APDUs received from the software distribution system in encrypted form.

12. An interface device according to claim 8 comprising means for encrypting the script of APDUs before loading to the programmable device.

13. An interface device according to claim 8 comprising means for adding a digital signature to the script of APDUs before loading to the programmable device.

14. An interface device according to claim 8 comprising means for adding a MAC to the script of APDUs before loading to the programmable device.

* * * * *